United States Patent
Gredinberg et al.

(10) Patent No.: US 6,955,470 B2
(45) Date of Patent: Oct. 18, 2005

(54) LOW COST FLUID DYNAMIC BEARING MOTOR

(75) Inventors: Alexander Gredinberg, San Jose, CA (US); Jerry Joseph Weingord, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/775,525

(22) Filed: Feb. 9, 2004

(65) Prior Publication Data

US 2004/0161181 A1 Aug. 19, 2004

Related U.S. Application Data

(62) Division of application No. 10/071,752, filed on Feb. 7, 2002, now Pat. No. 6,694,617
(60) Provisional application No. 60/343,719, filed on Oct. 26, 2001.

(51) Int. Cl.[7] .............................................. F16C 32/06
(52) U.S. Cl. ..................................................... 384/107
(58) Field of Search ................................. 384/100, 107, 384/112

(56) References Cited

U.S. PATENT DOCUMENTS 6,390,681 B1 * 5/2002 Nakazeki et al. ........... 384/107
6,554,475 B2 * 4/2003 Yamada ...................... 384/107
6,712,514 B2 * 3/2004 Mori et al. .................. 384/107

* cited by examiner

Primary Examiner—Thomas R. Hannon

(57) ABSTRACT

A method of assembling a motor comprising assembling the shaft and thrust plate to be used in the fluid dynamic bearing assembly, and at least partially inserting the combined shaft and thrust plate into a sleeve which is adapted to support a hub which in turn may support one or more disks for rotation in a disc drive or similar environment. A counterplate cup of a generally U shaped or cup shaped design including a base which is substantially parallel to a top surface of the thrust plate, and sides of a diameter which is slightly greater than the diameter of the thrust plate and which are parallel to the thrust plate is provided, filled with oil, and having its open end facing the thrust plate.

Next the shaft and hub are pressed with the counterplate cup, the counterplate cup being pressed down over the end of the thrust plate so that the upraised sides of the cup fit easily over the ends of the thrust plate and can be pressed fit tightly over the upraised outer surface of the sleeve, tightly fitting the inside of the counterplate cup over the outside surface of the sleeve. During this press fit, the oil is pushed out of the region between the thrust plate upper surface and the counterplate cup bottom surface, and as the upraised sides of the cup fit over the outside of the sleeve, the oil fills the section between the lower surface of the thrust plate and the upper surface of the sleeve as well as the gap between the shaft and the surrounding sleeve.

4 Claims, 4 Drawing Sheets

LOW COST FLUID DYNAMIC BEARING MOTOR

CROSS REFERENCE TO A RELATED APPLICATION

This application claims priority to a provisional application Ser. No. 60/343,719, filed Oct. 26, 2001, entitled Low Cost Assembly Plate FDB Motor invented by Greidenberg and Weingord and incorporated herein by reference.

This is a divisional of application Ser. No. 10/071,752 filed on Feb. 7, 2002 now U.S. Pat. No. 6,694,617.

FIELD OF THE INVENTION

The present invention relates to the field of hydrodynamic bearing assemblies of the type which provides support and rotation for a high speed spindle element or hub. More specifically, the invention relates to improved hydrodynamic bearing assembly design which facilitates ease of assembly, as well as an improved method for filling a hydrodynamic bearing with fluid.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

During operation, the discs are rotated at very high speeds within an enclosed housing by means of an electric motor which is generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle, and the other near the bottom. These bearings allow for rotational movement between the shaft and hub, while maintaining accurate alignment of the spindle to the shaft. The bearings themselves are normally lubricated by grease or oil.

The conventional bearing system described above, however, is prone to several shortcomings. First is the problem of vibration generated by the balls rolling on the raceways. Ball bearings used in hard disc drive spindles run under conditions that generally guarantee physical contact between raceway and ball, in spite of the lubrication layer provided by the bearing oil or grease. Hence, bearing balls running on the generally smooth but microscopically uneven and rough raceways, transmit this surface structure as well as their imperfection in sphericity in the form of vibration to the rotating disc. This vibration results in misalignment between the data tracks and the read/write transducer, limiting the data track density and the overall performance of the disc drive system.

Another problem is related to the application of hard disc drives in portable computer equipment and resulting requirements in shock resistance. Shocks create relative acceleration between the discs and the drive casting which in turn show up as a force across the bearing system. Since the contact surfaces in ball bearings are very small, the resulting contact pressures may exceed the yield strength of the bearing material, and leave long term deformation and damage to the raceway and the balls of the ball bearing.

Moreover, mechanical bearings are not easily scaleable to smaller dimensions. This is a significant drawback since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems. The reason for the popularity of the use of air is the importance of avoiding the outgassing of contaminants into the sealed area of the head/disc housing. However, air does not provide the lubricating qualities of oil. The relative high viscosity of oil allows for larger bearing gaps and therefore greater tolerances to achieve similar dynamic performance.

In the case of a hydrodynamic bearing employing a liquid lubricant, the lubricating liquid must be reliably loaded into the bearing in order to maximize the load bearing capacity of the bearing. It is especially important to avoid the presence of any air bubbles within the oil carrying region of the bearing. With maximum oil fill in the hydrodynamic bearing, a stiffer motor is created.

The absence of air bubbles will minimize the pressure build-up inside the motor due to drops in ambient pressure and/or thermal expansion from increased temperature. This is due to the fact that while air bubbles will expand with changes in pressure or temperature, oil has little change in volume with such changes.

As little as 10% air in a typical fluid bearing could theoretically cause leakage through the seals at the ends of the bearings if the bearing is being stored at 0 degree C. Such failure of the bearing to contain the lubricant would cause contaminants to be expelled into the head disc region of the disc drive. The loss of some bearing fluid could cause the physical surfaces of the spindle and housing to contact one another, leading to increased wear and eventual failure of the bearing system.

Known techniques for filling the hydrodynamic bearing with oil require that the motor be capped after filling, i.e., that the entry channel for injecting the oil or other fluid into the bearing be closed and sealed after the oil is inserted. This is a difficult and complex process which easily results in the entrapment of air.

In view of the many long term benefits of a reliable hydrodynamic bearing design, the establishment of a reliable process for injecting fluid into the hydrodynamic bearing without allowing the entrapment of any air is highly desirable.

More particularly, a conventional single plate fluid dynamic bearing motor, comprises a shaft with a thrust plate supported at an end thereof. The process of filling the hydrodynamic bearings which support the shaft and thrust plate for relative rotation requires filling the hydrodynamic bearing with fluid, and then laser welding or insertion of a gasket to seal the gap between the sleeve which surrounds the shaft and the counterplate which faces the thrust plate to prevent oil leakage from a bearing. In such a design, the oil fill process is typically done in two steps: 1) In a first step, air is evacuated from the bearing cavity; and 2) In the second step, oil is filled into the cavity. An example of such a process appears in U.S. Pat. No. 5,601,125 assigned to the assignee of the present invention which demonstrates placing the assembled bearing into a sealed environment, establishing a vacuum, inserting the oil into the hydrodynamic bearing cavity or gap, and then completing the enclosure of the bearing gap to retain the fluid therein. This process, as well as the more direct processes of oil filling followed by laser welding or gasket insertion, required sophisticated and expensive oil filling machinery, and laser welding or other alignment steps.

Therefore, development of a design and an assembly method for simplifying insertion of oil into a fluid dynamic bearing remains highly desirable.

SUMMARY OF THE INVENTION

It is therefore an objective of the present invention to overcome the limitations of the prior art.

It is a further objective of the present invention to provide an improved design for a single plate fluid dynamic bearing motor which may be more easily filled with fluid.

A related objective of the invention is to provide a method for simplified filling of a single thrust plate fluid dynamic bearing motor. A further objective of the invention is to provide a method and apparatus for achieving a single plate fluid dynamic bearing motor in which the number of steps of assembly are diminished.

A related objective of the invention is to provide a method and apparatus for assembly of a single plate fluid dynamic bearing motor wherein the likelihood of air being trapped in the fluid is diminished, and steps for evacuation of air from the fluid probably do not need to be taken.

These and other objectives of the present invention are provided by assembling the shaft and thrust plate to be used in the fluid dynamic bearing assembly, and at least partially inserting the combined shaft and thrust plate into a sleeve which is adapted to support a hub which in turn may support one or more disks for rotation in a disc drive or similar environment. A counterplate cup of a generally U shaped or cup shaped design including a base which is substantially parallel to a top surface of the thrust plate, and sides of a diameter which is slightly greater than the diameter of the thrust plate and which are parallel to the thrust plate is provided, filled with oil, and having its open end facing the thrust plate.

Next the shaft and hub are pressed with the counterplate cup, the counterplate cup being pressed down over the end of the thrust plate so that the upraised sides of the cup fit easily over the ends of the thrust plate and can be pressed fit tightly over the upraised outer surface of the sleeve, tightly fitting the inside of the counterplate cup over the outside surface of the sleeve. During this press fit, the oil is pushed out of the region between the thrust plate upper surface and the counterplate cup bottom surface, and as the upraised sides of the cup fit over the outside of the sleeve, the oil fills the section between the lower surface of the thrust plate and the upper surface of the sleeve as well as the gap between the shaft and the surrounding sleeve. As a part of or subsequent to the step of pressing the counterplate cup and the shaft plate combination together, the thrust plate is also pressed down against the facing axial surface of the shaft until only a small gap remains so that the thrust bearing between the thrust plate and the sleeve is established. The end surface of the side of the cup is then sealed to the surface of the sleeve using an epoxy or the like so that the fluid cannot be lost during use.

The method and apparatus described summarily above and in detail below may be used either with a fluid dynamic bearing or a motor incorporating such a bearing, and is useful with bearings and motors of several designs. The method and apparatus are explained below with reference to a single motor model with which it is known to be useful. However, the scope of the present invention is not limited to its utilization with the single bearing design or motor model.

Other features and advantages of the present invention will become apparent to a person who skilled in the art who studies the following detailed description of a preferred embodiment of the method and apparatus of the present invention, given in conjunction with the accompanying drawings.

Figure 3A:
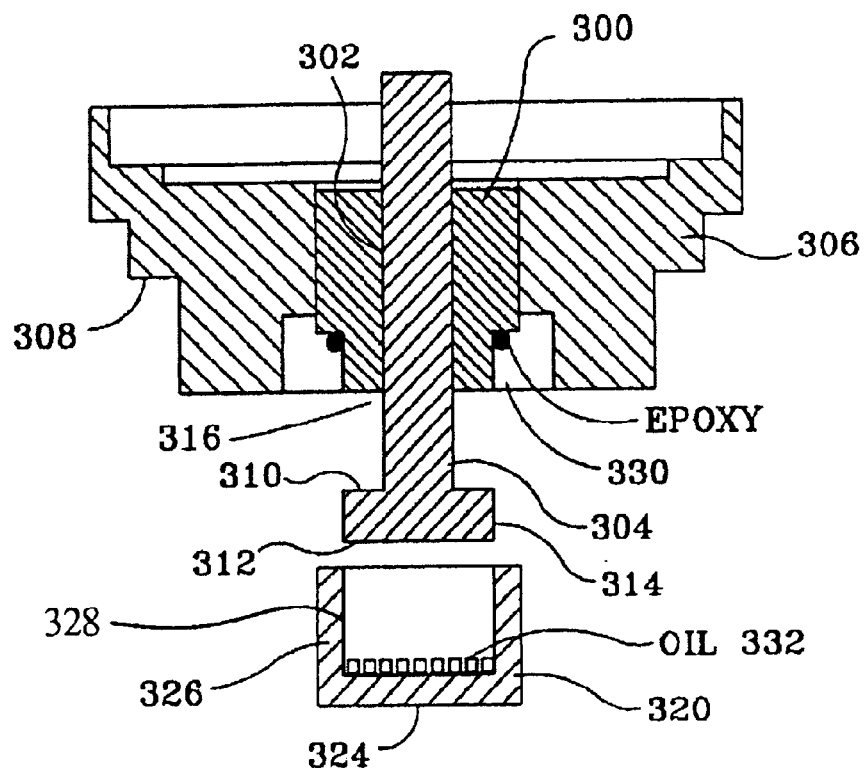
Figure 3B:
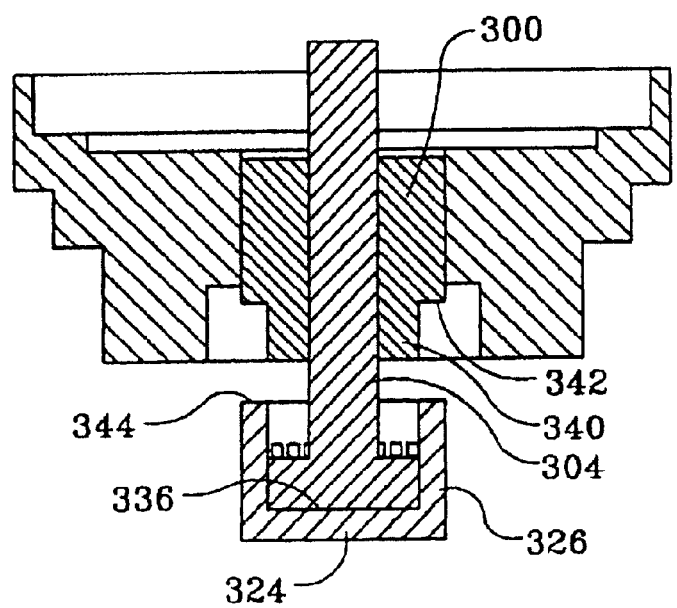
Figure 3C:
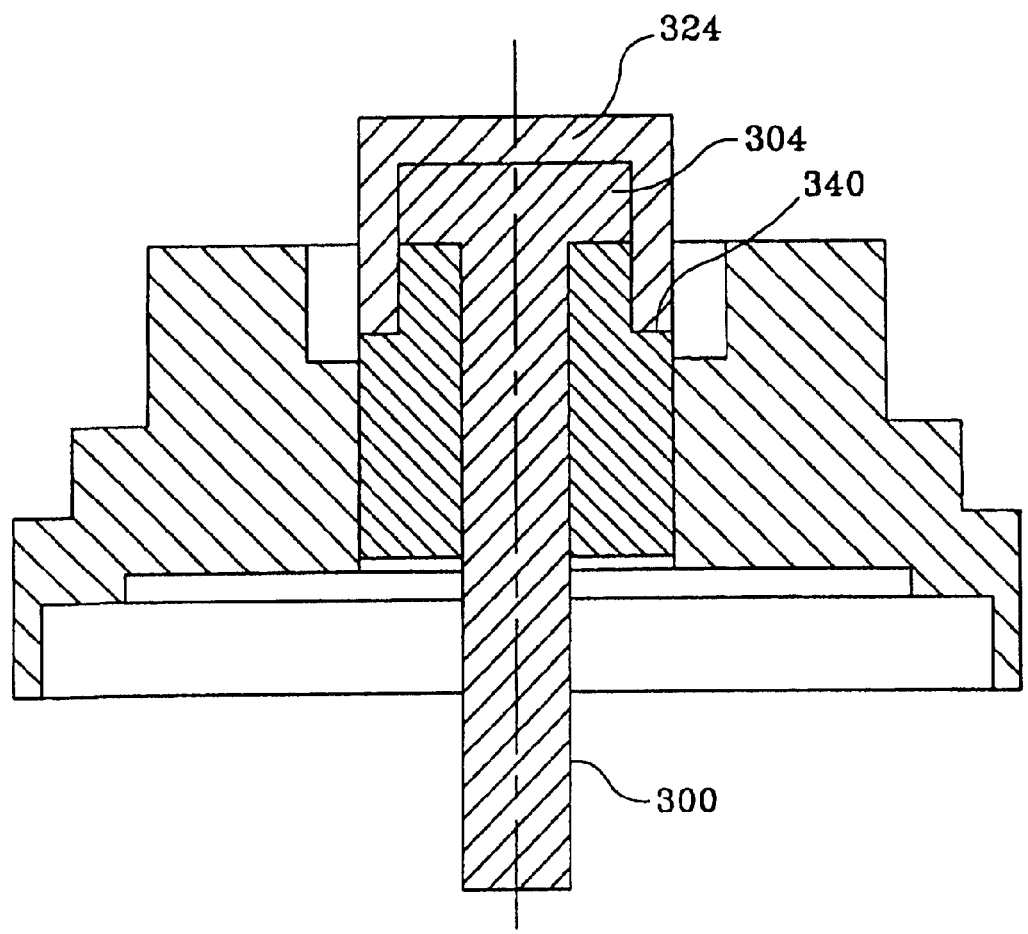

And, FIGS. 3A and 3B and 3C are vertical sectional view illustrating the steps of assembly of the present method, and the finished fluid bearing design.

DETAILED DESCRIPTION OF THE PREFERRED EMBODIMENTS

The description to follow is of a preferred embodiment of the present invention which is structurally a modification of a known hydrodynamic bearing design incorporating at least one thrust plate on the shaft; the method disclosed also modifies the method for assembly of the hydrodynamic bearing disclosed, and the method for filling the hydrodynamic bearing with fluid.

It should be noted that this modified design and assembly and filling method is disclosed as being especially useful in a disc drive. Hydrodynamic bearings have many other uses than in hard disk drives, and the invention herein is not intended to be limited to use in such an environment. However, the design herein is especially useful in hydrodynamic bearings for hard disc drives, because of the importance of not having any residual fluid either leak out of the motor or be expelled from the bearing over the life of the bearing as such would contaminate the atmosphere within the hard disc drive with droplets or outgassing.

It is always a major concern in the design of a hard disc drive spindle motor incorporating a hydrodynamic bearing to ensure that the lubricant or fluid is confined to the region where it lubricates the relatively rotating surfaces, and cannot escape to the regions where the data storing discs are located. Thus the present design which provides a hydrodynamic bearing which is both easily assembled and thereafter tightly sealed against allowing escape of fluid from the hydrodynamic bearing is highly desirable.

Figure 1:
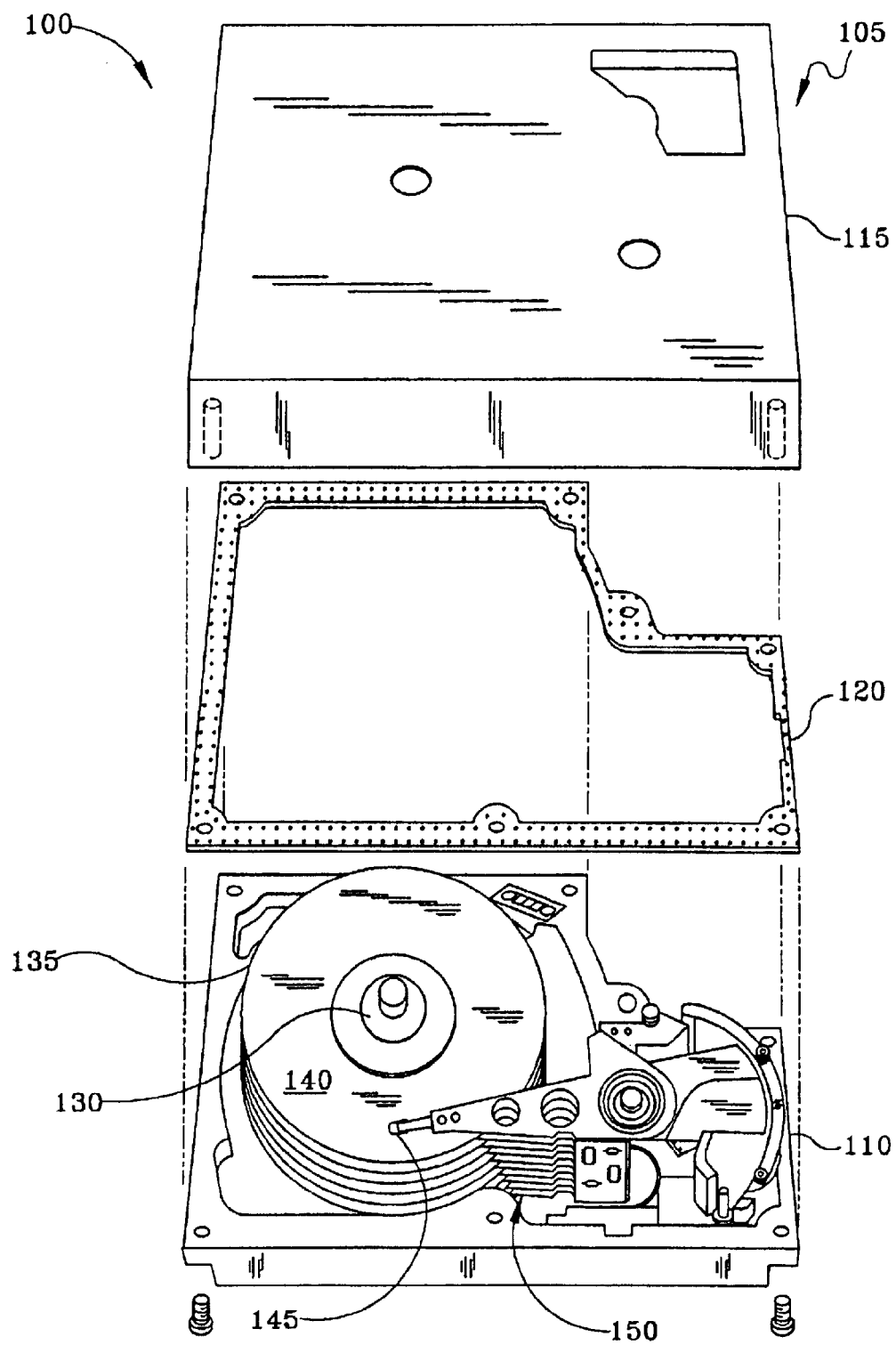
FIG. 1 illustrates an exploded view of a typical disc drive in which a motor incorporating the bearing assembled according to the disclosed method is useful.

FIG. 1 is an exploded perspective view of a magnetic disc drive for which a spindle motor having a fluid dynamic bearing manufactured by the method and apparatus of the present invention is particularly useful. Referring to FIG. 1, a disc drive 100 typically includes a housing 105 having a base 110 sealed to a cover 115 by a seal 120. The disc drive 100 has a spindle 130 to which are attached a number of discs 135 having surfaces 140 covered with a magnetic media (not shown) for magnetically storing information. A spindle motor (not shown in this figure) rotates the discs 135 past read/write heads 145 which are suspended above surfaces 140 of the discs by a suspension arm assembly 150. In operation, spindle motor rotates the discs 135 at high speed past the read/write heads 145 while the suspension arm assembly 150 moves and positions the read/write heads over one of several radially spaced tracks (not shown). This allows the read/write heads 145 to read and write magnetically encoded information to the magnetic media on the surfaces 140 of the discs 135 at selected locations.

Figure 2:
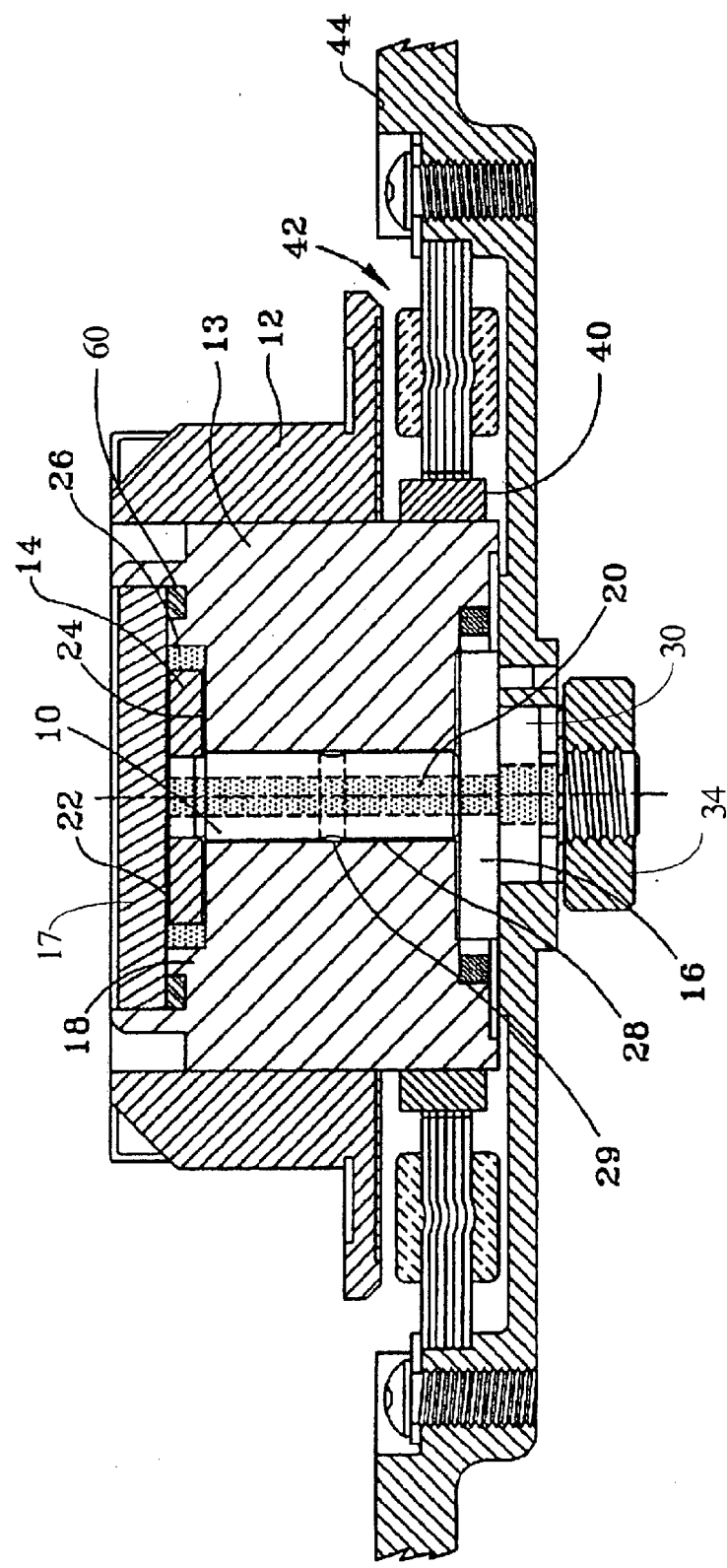
FIG. 2 illustrates a typical hydrodynamic bearing motor which may be adapted to incorporate the bearing of the present invention assembled according to the disclosed method.

The basic principles of the invention will be explained with respect to a hydrodynamic bearing utilized in a spindle motor whose description may be found in greater detail in U.S. Ser. No. 08/545,514 entitled "HYDRODYNAMIC BEARING ASSEMBLY WITH SINGLE SIDED GROOVE COUNTERPLATE" invented by Heine, Leuthold, Nagarathman, Jennings and Parsoneault. The basic structure of the motor, or at least as much as is relevant to this invention, as shown in FIG. 2 includes a stationary shaft 10 and a hub 12 supported from a sleeve 13 which rotates around the shaft. The shaft includes a thrust plate 14 at one end, and ends in a shoulder 16 at the opposite end which can be supported from a base 44. The sleeve supports a counterplate 17. One of the two opposing surfaces of the shaft/thrust plate assembly and the hub/counterplate assembly typically carries cylindrical sections of spiral grooves as is well known in this technology. The fluid may be supplied to all the lubricated surfaces from a reservoir 20 which runs through the center of the shaft 10. The lubricated surfaces include both the top and bottom surfaces 22, 24 of the thrust plate, the outside diameter 26 of the thrust plate, and the outside surface 28 of the circular shaft and the facing surface 29 of the sleeve 13.

A support plate 30 is located below the shoulder and a nut 34 located below the counterplate 30 which holds the primary structural elements of the motor together and holds the motor into base. The rotating sleeve also supports, below the hub, a magnet 40 which interacts with a stator 42 to cause rotation of the sleeve and the hub 12 that it supports.

As can be seen from an inspection of the motor design of FIG. 2 the flat counterplate is supported inside a shoulder of the sleeve and facing the thrust plate, with the gap between the thrust plate and counterplate and the opposite side of the thrust plate and the sleeve being filled with hydrodynamic bearing fluid. A seal comprising a gasket ring or "O" ring 60 or a laser weld at the juncture between the shoulder and the counterplate must be provided in order to prevent the loss or escape of fluid. As noted above, this is both an expensive and time consuming assembly process.

Therefore, the modified design shown in FIGS. 3A, 3B and 3C, and the associated method of assembly, was adopted to simplify assembly, eliminating both part costs and assembly steps.

Referring first to FIG. 3A, the assembly of the fluid dynamic bearing begins with a sleeve 300 having a bore 302 through which the shaft and thrust plate combination 304 will extend. As is already well known in the field, fluid will be maintained in the gap 302 between the outer surface of shaft 304 and the inner surface or bore of sleeve 300 in order to support the shaft against radial deflection, and allow for relative rotation between the shaft 304 and sleeve 302. As is also illustrated in this figure, the outer surface of the sleeve 300 supports a hub 306 for rotation with the sleeve 300. This hub 306 includes an axial surface 308 which will support one or more discs (not shown).

As was already explained with the respect to FIG. 2, the axial surfaces 310, 312 of the thrust plate 314 supported on the end of the shaft 304 each cooperate with a facing surface to define a fluid bearing which will support the shaft against axial deflection. In this design, an axial surface 316 is provided which will cooperatively face an axial surface of thrust plate 314 across a fluid filled gap to define one such thrust bearing. Fluid must of course be inserted into and maintained in this gap in order to establish the fluid dynamic bearing. In order to provide this fluid, as well as establish the fluid bearing between the axially distal surface 312 and a facing surface, a counterplate cup 320 is provided. The counterplate cup comprises a base surface 324 which will define the counterplate to the axial surface 312 of the thrust plate; and further comprises cup sides 326 whose inner surface 328 cooperates during assembly with an outer surface 330 of sleeve 300 to capture the thrust plate and shaft, and force the fluid into all fluid dynamic bearing regions.

This assembly and filling sequence is carried out by filling the counterplate cup 320 with fluid or oil 332. At this point, the shaft and thrust plate combination 304, 314 is merged with the sleeve 300, extending at least part way through it. The counterplate cup 324 is now moved axially toward the shaft, and the sides 326 pass over the outer ends of the thrust plate 314, pressing the shaft axially down through the sleeve. In the most efficient approach, the counterplate cup is first pressed almost completely over the thrust plate so that the thrust plate surface 312 is pressed down against the facing surface 336 of the counterplate cup 324 as shown in FIG. 3B.

The counterplate cup is then further pushed forward until the sides 326 pass over the reduced diameter region 340 of the sleeve 300 and butt up against the shoulder 342 of the sleeve 300. The location of the shoulder 342 cooperates with the outer surface of the 344 of the cup sides 326 to determine the total gap width available for the thrust bearings on either side of the thrust plate 314. At the same time, it is readily apparent from inspection that because the fit between the cup side 326 and the outer surface of the reduced diameter 340 is extremely tight and in fact designed to be a friction or press fit, that no fluid can escape through this region. Therefore, the fluid remains in part in the gap between the surface 312 of the thrust plate 314 and the facing surface of the cup 324; it also fills the gap between the surface 316 of the sleeve and the facing surface 310 of the thrust plate; and also fills the gap 302 between sleeve 100 and shaft 304 thereby establishing the necessary fluid distribution throughout the fluid dynamic bearings of the design.

As a final step, the counterplate cup is held in place against the gap setting surface 342 of the sleeve 300 using epoxy or adhesive which can be either previously applied to one of the surfaces or applied at this time, fixing the counterplate cup in place relative to the sleeve 300. In this way, the counterplate cup merges with the sleeve 300, setting the gaps for the thrust plate bearings, and filling these gaps as well as the journal bearing gap simultaneously in a single step. Carrying the steps out in this way, the no air evacuation is required. Further, the axial displacement of the thrust plate relative to the sleeve and the counterplate surface of the counterplate cup are all accomplished accurately while the gaps are filled with fluid.

The finished motor appears in FIG. 3C, and includes the shaft 300, the thrust plate 304 set accurately in place and sealed to the sleeve covered by the counterplate cup 324 whose axial setting is established by the sleeve surface 340.

Adoption of the design described above and the accompanying method of assembly eliminates the need for both laser welding and for complex oil filling machines for single thrust plate/shaft motor designs. The design and method described herein lends itself to manufacturing of the motor in a contract manufacturing environment, due to the minimal capital investment required to produce the motor. The equipment costs necessary to produce the motor is reduced as is the assembly time for motor.

What is claimed is:

1. A hydrodynamic bearing system comprising a shaft, a thrust plate supported on an end of the shaft and having first and second axially directed surfaces, a sleeve surrounding the shaft and having an inner surface defining a gap with an outer surface of the shaft, a journal bearing being defined in the gap by grooves on one of the surfaces and fluid in the gap, the hydrodynamic bearing system further comprising a first thrust bearing defined in a gap between at least one of the axially directed surfaces of the thrust plate and a cooperating surface facing one of the thrust plate surfaces across a gap, and a counterplate cup having a base defining one surface of a second bearing thrust and defining a gap therewith, and having upraised sides tightly fitted over a outer surface of the sleeve, wherein said upraised sides of the counterplate cup are fit over a reduced diameter section of the sleeve.

2. A fluid dynamic bearing as claimed in claim 1 wherein a region of the side of the cup is fixed to an outer surface of the sleeve by adhesive or epoxy.

3. A fluid dynamic bearing as claimed in claim 2 wherein the adhesive or epoxy joins the distal end of the cup side to the outer surface of the reduced diameter portion of the sleeve.

4. A fluid dynamic bearing as claimed in claim 3 wherein one of the base of the cup and the axially distal surface of the thrust plate comprises a pattern of grooves to establish a fluid dynamic bearing across the gap between the two surfaces, fluid in the gap establishing the thrust bearing to support relative rotation of the thrust plate and the counterplate cup.

* * * * *